M. B. FRASER,
Assignor to WHITMAN & BURRELL.
Cheese-Press.
No. 9,228. Reissued June 1, 1880.
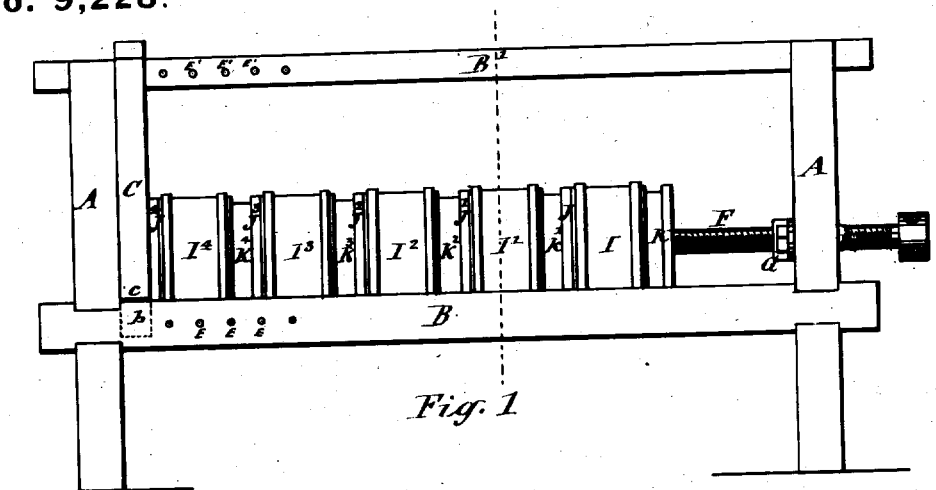
Fig. 1
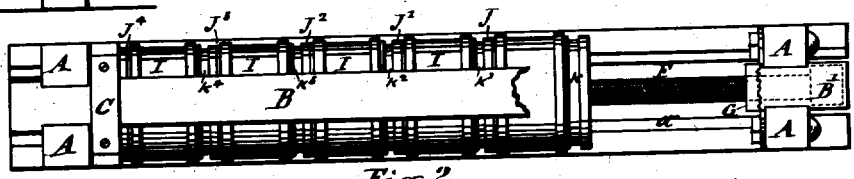
Fig. 2
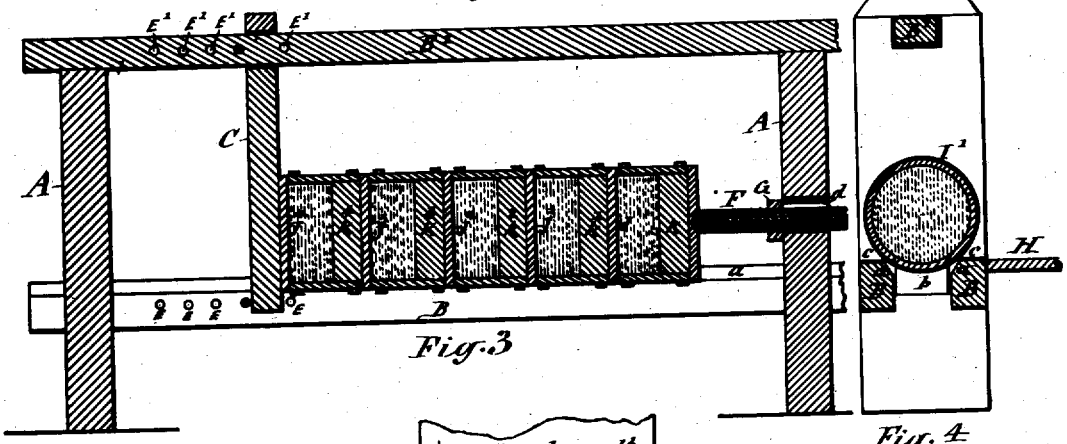
Fig. 3
Fig. 4
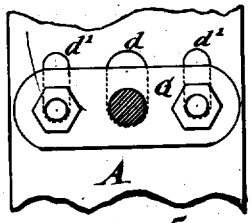
Fig. 5
WITNESSES:
Wm. L. Raymond.
E. Laass
INVENTOR:
Milton B. Fraser
per Duell, Laass & Hay
Attorneys

UNITED STATES PATENT OFFICE.

MILTON B. FRASER, OF ROME, ASSIGNOR TO WHITMAN & BURRELL, OF LITTLE FALLS, NEW YORK.

CHEESE-PRESS.

SPECIFICATION forming part of Reissued Letters Patent No. 9,228, dated June 1, 1880.

Original No. 80,158, dated July 21, 1868. Application for reissue filed May 7, 1880.

*To all whom it may concern:*

Be it known that I, MILTON B. FRASER, of Rome, in the county of Oneida, in the State of New York, have invented new and useful Improvements in Cheese-Presses, of which the following, taken in connection with the accompanying drawings, is a full, clear, and exact description.

The object of this invention is to provide a simple, convenient, and effective means of pressing a number of cheeses at one operation; and it consists, chiefly, of a press-frame having supports or guides for the cheese-hoops or receptacles containing the substance to be pressed, and provided at one end of said supports with an adjustable foot-block, and at the opposite end with suitable pressing mechanism, as hereinafter more fully described.

It also consists in the combination, with the aforesaid press, of cheese hoops or cylinders, each furnished with a separate pressing-follower, and all arranged between the foot-block and plunger of the press in such a manner that the pressure of the plunger is transmitted throughout the entire series of hoops aforesaid, and thus a number of cheeses are pressed at one operation.

The following more specific description will enable others skilled in the art to make and use my invention.

In the accompanying drawings, Figure 1 is a side elevation of a press embodying my improvements. Fig. 2 is a top view of same, a portion of the frame being broken away to afford a better illustration of some of its details. Fig. 3 is a longitudinal section of the press as it appears when a series of cheeses have been pressed in it and before the cheeses are removed. Fig. 4 is a transverse section of the press; and Fig. 5 is a detail view, illustrating the adjustability of the position of the nut in relation to the axis of the cheese-hoops.

Similar letters of reference indicate corresponding parts.

A A represent two uprights or standards, forming the end of the press-frame. At a convenient height from the floor are two parallel stringers or bed-pieces, B B, framed near their extremities to the standards A A aforesaid. These stringers are arranged a proper distance apart, and chamfered at their inner upper edges, *a a*, so as to form a suitable support for the convex side of the cheese-hoop, which is laid thereon, as best seen in Fig. 4 of the drawings.

The top of the standards A A is braced by a longitudinal string-beam, B′, arranged centrally above the bed-pieces or stringers B B, and framed into the standards A A at their extremities.

C denotes the foot-block of the press, seated upon the bed-pieces B B, as shown at *c c*, and having an extension or tongue, *b*, passing between the same, to serve as a guide for said foot-block. The upper end of the foot-block is provided with a mortise or aperture, through which the top stringer, B′, passes.

The bottom stringers, B B, and top stringer, B′, are provided, respectively, with a series of holes, E E and E′ E′, arranged in the same relative position. By means of pins D D′, inserted, respectively, through the holes E E′ back of the foot-block, the latter is held at any desired distance from the end of the press-frame.

Through an elongated hole, *d*, in the standard A, at the opposite end of the press-frame, passes a power-screw, F, which works in a nut, G, firmly secured to the inner side of said standard by screw-bolts, which also pass through elongated holes or slots *d′ d′* in the standard A, as illustrated in Fig. 5 of the drawings. The aforesaid elongated passages *d* and *d′ d′* allow the nut G to be raised or lowered, so as to adjust the screw in its position and bring the same in range with the axis of the cheese-hoops laid upon the bed B.

The screw F may be adapted to be operated by hand-spikes or lever, as shown, or provided with other suitable means, such as a crank or gearing, as may be deemed necessary to effectually and conveniently operate the same.

I $I'$ $I^2$ $I^3$ $I^4$ represent firmly-bound cheese-hoops, provided, respectively, with detachable bottoms J $J'$ $J^2$ $J^3$ $J^4$, applied thereto by hooks or any other well-known and suitable fastenings.

K $K'$ $K^2$ $K^3$ $K^4$ are followers or plungers fitting neatly the interior of the respective hoops, and being of a thickness equal to about one-third the depth of the hoops.

The hoops I I′ $I^2$ $I^3$ $I^4$, with their bottoms secured to them and filled, or partially filled, with curd, and with the followers applied to the top thereof, are successively rolled into the bed or support between the two bottom stringers, B B, before described. The screw or plunger F having been previously retracted, the first hoop is placed with its follower contiguous to the press-head or end of the screw or plunger, and each succeeding hoop is set with its follower close up to the bottom of the preceding hoop, and the foot-block C is set up to the bottom of the last hoop and secured in its position by means of the pin D, inserted into the holes E E′ in the stringers of the press-frame, as before described. After everything is properly arranged, as last described, the screw-power is applied. The hoops being allowed to slide on their bed causes the pressure to be transmitted from the first hoop throughout the entire series of hoops, and thus the curd in all of them to be pressed at one operation. If the curd should be light or very porous and the followers should all enter their entire length into their respective hoops at one operation of running out the screw, the screw may be retracted, the hoops set apart, and additional or supplemental followers or blocks interposed between the several followers and the bottom of the adjacent hoop, and then a second pressure of the screw applied to them; but should the followers be quite long enough, and the screw run out before the followers are entered their full length into the hoops, it is only necessary to run back the screw, set forward the hoops and foot-block, and repeat the application of the screw-power.

The setting up of the foot-block may be effected simultaneously with the running back of the power-screw by simply attaching two hook-rods to the foot-block and extending said rods to the blank neck of the screw, and connecting them thereto by a collar, which loosely embraces said part of the screw, so as to allow the same to freely turn in the collar, but is forced to move longitudinally with said screw.

If desirable or necessary, an adjustable guide-bar may be applied to the top of the hoops, for the purpose of maintaining them in perfect range and preventing their springing up from their bed-timbers B B, or moving in any manner out of position.

In order to retain the followers in a central line at the first insertion of them into the hoops, spring-catches are to be applied at the entrances of the hoops. These catches, being beveled, will admit the follower, bind slightly upon it, and when the follower is forced home they will spring out behind the follower and retain it within the hoop even when the hoops are separated. The main object of these hooks is to perform the last result—*i. e.*, retain the followers in place after the pressing is complete; but they will also serve to center and hold the follower while being adjusted.

On one side of the press-frame a table, H, is to be provided, upon which the cheese-hoops may be placed and manipulated.

It will be observed that by my improved press the process of pressing cheeses is greatly expedited and facilitated. When the cheeses become set and ready for removal they are readily rolled separately out of their bed onto the table, when they can be removed from their hoops.

In Fig. 1 of the drawings the screw is represented as having been partly run out, and the followers as only partly forced home. In Fig. 2 the screw is represented as being run out its entire length, and the followers still not forced home. In Fig. 3 the foot-block and cheese-hoops are shown as having been moved forward, and the screw is partly run out, having been retracted and again started forward and the followers forced home.

The merits of my invention will be best appreciated in factories where a large number of cheeses are manufactured, the work of pressing the cheeses heretofore requiring the use of as many as thirty cheese-screws, and incurring an outlay of a large amount of capital, all of which is obviated by my invention, which is capable of pressing as many as thirty cheeses in one day with half the labor and attention heretofore required, and with better results.

Furthermore, by the arrangement of the cheese-hoops end to end, and with their followers all in one line, great power is obtained and great economy in room effected.

Having thus described my invention, what I claim as new, and desire to secure by Letters Patent, is—

1. The combination and arrangement, in a press, of two or more cheese-hoops arranged movably, and with their axis in line with each other, between the foot-block and head-block of the press, each of said hoops being provided with a separate follower, that of the first hoop being contiguous to the head-block and that of each of the succeeding hoops receiving the impact of the bottom of the preceding hoop, substantially as shown and described.

2. A gang cheese-press consisting of two or more cylindrical hoops or receptacles for the curd to be pressed, each of said hoops provided with a removable bottom and with a follower adapted to enter the top of said hoop, and all arranged movably between the last hoop or receptacle aforesaid and the plunger or screw of the press, and in axial line with the latter, all substantially as set forth.

3. The within-described method of pressing a number of cheeses at one operation, consisting in filling a number of cheese-hoops with curd, applying respectively to the top of same a follower adapted to enter the hoop, then placing the hoops successively with the bottom of one upon or against the follower of the other, and in range with the plunger or screw of the press, and then subjecting to the pressure of the latter the entire series of hoops, with their respective followers, substantially as shown and set forth.

4. In a gang-press, the combination of a trough or bed for the support of the receptacle containing the substance to be pressed, a resisting foot-block at one end of said trough or bed, and a head-block and pressing mechanism at the opposite end of same, substantially as set forth.

5. The within-described apparatus for pressing a number of cheeses at one operation, consisting of a horizontal trough or bed provided at one end with a resisting foot-block and at the opposite end with a head-block moved by suitable power, and a series of parallel-sided or cylindrical receptacles or cheese-hoops provided, respectively, with a follower adapted to enter the top end of same, the said cheese-hoops having their axial center in range with the plunger or screw of the press, substantially as shown and set forth.

6. In combination with cheese-hoops mounted movably on the bed of the press and arranged end to end in line with the power-screw, a resisting-block arranged adjustably in its position in relation to its distance from the end of the series of cheese-hoops aforesaid.

7. A press-frame constructed of the ways or skids B B, uprights A A, top beam, B′, adjustable foot-block C, nut G, and screw F, substantially in the manner described and shown.

8. A series of separated hoops, each provided with a removable bottom and a removable follower, in combination with a guiding and supporting frame and a press-plunger at the end of said frame, substantially as set forth.

9. The cylinders or hoops I I′ $I^2$ $I^3$ $I^4$, in combination with the removable bottoms J J′ $J^2$ $J^3$ $J^4$, followers K K′ $K^2$ $K^3$ $K^4$, screw F, head-block C, and skids B B, substantially as described and shown.

10. In combination with the horizontal press-frame B B B′, screw F, and a series of cheese-hoops provided, respectively, with separate followers, as described, the head-block C, arranged adjustably upon the press-frame, substantially in the manner shown, for the purpose set forth.

11. In combination with a gang of press-cylinders arranged upon a press-frame, as described, a press plunger or screw arranged adjustably in relation to the axis of the said cylinders, substantially as set forth.

12. The nut G, screw F, and bolts, in combination with the standard A, provided with slots *d d′ d′*, substantially as described and shown.

In testimony whereof I have hereunto set my hand this 28th day of February, at Rome, New York.

MILTON B. FRASER.

Witnesses:
HOMER T. FOWLER,
GEORGE W. G. KINNEY.